(12) United States Patent
Rodriguez et al.

(10) Patent No.: US 12,291,827 B2
(45) Date of Patent: May 6, 2025

(54) METHODS AND APPARATUS FOR A SINGLE HANDLE REFUSE BAG

(71) Applicant: Papeltec Overseas, Inc., Atlantic Beach, FL (US)

(72) Inventors: Victor Rodriguez, Jacksonville, FL (US); Peter A. Rodriguez, Jacksonville, FL (US); Jason Rodriguez, Jacksonville, FL (US); Craig Austin, Jacksonville, FL (US)

(73) Assignee: Papeltec Overseas, Inc., Atlantic Beach, FL (US)

( * ) Notice: Subject to any disclaimer, the term of this patent is extended or adjusted under 35 U.S.C. 154(b) by 0 days.

(21) Appl. No.: 18/442,038

(22) Filed: Feb. 14, 2024

(65) Prior Publication Data
US 2024/0200294 A1    Jun. 20, 2024

Related U.S. Application Data

(63) Continuation of application No. 18/116,073, filed on Mar. 1, 2023, now Pat. No. 11,933,007.

(60) Provisional application No. 63/315,089, filed on Mar. 1, 2022.

(51) Int. Cl.
*E01H 1/12* (2006.01)

(52) U.S. Cl.
CPC ... *E01H 1/1206* (2013.01); *E01H 2001/1266* (2013.01); *E01H 2001/1286* (2013.01)

(58) Field of Classification Search
CPC .......... E01H 1/1206; E01H 2001/1266; E01H 2001/1286; A01K 23/005
See application file for complete search history.

(56) References Cited

U.S. PATENT DOCUMENTS

| | | | | |
|---|---|---|---|---|
| 4,156,400 A | * | 5/1979 | Migdal | E01H 1/1206 294/1.3 |
| 4,335,678 A | | 6/1982 | Garza et al. | |
| 4,705,310 A | | 11/1987 | Scripter | |
| 4,787,584 A | * | 11/1988 | Palmer | B65B 67/1238 248/101 |
| 5,400,572 A | | 3/1995 | Peck et al. | |
| 5,676,411 A | | 10/1997 | Kwok | |
| 7,032,940 B1 | | 4/2006 | Smith | |
| 7,992,907 B1 | | 8/2011 | DeJesus | |
| 9,072,280 B1 | | 7/2015 | Ramoutar | |
| 9,999,200 B1 | | 6/2018 | Desimone | |
| 11,129,365 B1 | * | 9/2021 | Gregson | A01K 1/0107 |

(Continued)

OTHER PUBLICATIONS

International Search Report and Written Opinion issued on Jul. 18, 2023 in correlated International Application No. PCT/US23/14288.

*Primary Examiner* — Stephen A Vu
(74) *Attorney, Agent, or Firm* — Joseph P Kincart; Tracnik Law PLLC

(57) ABSTRACT

A pet refuse collection apparatus, and methods of use of the pet refuse collection apparatus, including a pet refuse bag supported by a fixture that allows the bag to be positioned underneath the pet to catch the refuse. A frame supports a refuse bag and may be manipulated with a single hand of a user while the frame supports a dispensed pet refuse bag in a position conducive to collecting pet refuse and additionally supports undispensed bags and stores a dispensed bag containing pet refuse.

19 Claims, 16 Drawing Sheets

(56) References Cited

U.S. PATENT DOCUMENTS

| | | | |
|---|---|---|---|
| 11,208,776 B1* | 12/2021 | Judd | A01K 23/005 |
| 2007/0176444 A1* | 8/2007 | Pilas | A01K 23/005 |
| | | | 294/1.5 |
| 2013/0062895 A1 | 3/2013 | Groth et al. | |
| 2017/0370056 A1* | 12/2017 | McDonald | B65D 33/002 |

\* cited by examiner

1300

| SUPPORT A REFUSE BAG SUPPORT MEMBER WITH A FIRST HANDLE PORTION COMPRISING A FIRST HANDLE PORTION PROXIMAL END AND A FIRST HANDLE PORTION DISTAL END AND A SECOND HANDLE PORTION COMPRISING A SECOND HANDLE PORTION PROXIMAL END AND A SECOND HANDLE PORTION DISTAL END, AND THE REFUSE BAG SUPPORT MEMBER IS SUPPORTED AT THE DISTAL END OF THE FIRST HANDLE PORTION AND THE SECOND HANDLE PORTION

1302

MAINTAIN A DISTANCE BETWEEN THE FIRST HANDLE PORTION AND THE SECOND HANDLE PORTION WITH A FIRST BRACE AND A SECOND BRACE

1304

THREAD A TRAPEZOIDAL LOOP THROUGH A FOLDED SLEEVE INCLUDED IN A PET REFUSE BAG

1306

SET THE TRAPEZOIDAL LOOP AT AN ANGLE TO THE FIRST HANDLE PORTION AND THE SECOND HANDLE PORTION

1308

HOOK AN INTEGRATED LOOP POSITIONED IN THE FOLDED SLEEVE OVER A HOOK FIXEDLY ATTACHED TO THE SECOND BRACE

1310

RECEIVE THE PET REFUSE INTO THE PET REFUSE BAG

1312

UNHOOK THE INTEGRATED LOOP FROM THE HOOK FIXEDLY ATTACHED TO THE SECOND BRACE

```
                    ┌─────────────┐
                    │   FIG. 13   │
                    └──────┬──────┘
                           ▼
┌─────────────────────────────────────────────────────────────┐
│      TIE THE REFUSE BAG CLOSED WITH THE INTEGRATED LOOP     │
│                                                              │
│                            1316                              │
└─────────────────────────────┬───────────────────────────────┘
                              ▼
┌─────────────────────────────────────────────────────────────┐
│  ACTUATE A LIGHT SUPPORTED BY THE FIRST BRACE, AND          │
│  ILLUMINATING THE REFUSE BAG                                 │
│                                                              │
│                            1318                              │
└─────────────────────────────┬───────────────────────────────┘
                              ▼
┌─────────────────────────────────────────────────────────────┐
│  ACTUATE AN AUDIO GENERATOR SUPPORTED BY THE FIRST BRACE    │
│  TO GENERATE A DISTINCT SOUND ASCERTAINABLE BY A DOG        │
│                                                              │
│                            1320                              │
└─────────────────────────────┬───────────────────────────────┘
                              ▼
┌─────────────────────────────────────────────────────────────┐
│  MAINTAIN THE FIRST HANDLE PORTION GENERALLY PARALLEL TO    │
│  THE SECOND HANDLE PORTION                                   │
│                                                              │
│                            1322                              │
└─────────────────────────────┬───────────────────────────────┘
                              ▼
┌─────────────────────────────────────────────────────────────┐
│  STORE A SOILED REFUSE BAG IN A REFUSE BAG CONTAINER        │
│  ATTACHED TO AT LEAST ONE OF THE FIRST HANDLE PORTION AND   │
│  THE SECOND HANDLE PORTION                                   │
│                                                              │
│                            1324                              │
└─────────────────────────────┬───────────────────────────────┘
                              ▼
┌─────────────────────────────────────────────────────────────┐
│  STORE A SOILED REFUSE BAG ON A HOOK ATTACHED TO AT LEAST   │
│  ONE OF THE FIRST HANDLE PORTION AND THE SECOND HANDLE      │
│  PORTION                                                     │
│                                                              │
│                            1326                              │
└─────────────────────────────┬───────────────────────────────┘
                              ▼
                    ┌─────────────┐
                    │  FIG. 13B   │
                    └─────────────┘
```

FIG. 13A

METHODS AND APPARATUS FOR A SINGLE HANDLE REFUSE BAG

CROSS REFERENCE TO RELATED APPLICATIONS

This application claims priority to U.S. Non-Provisional application Ser. No. 18/116,073, filed Mar. 1, 2023, which claims the benefit of U.S. Provisional Application No. 63/315,089, filed Mar. 1, 2022, and entitled SINGLE HANDLE REFUSE BAG, the entire disclosure of which is incorporated herein by reference.

FIELD OF THE DISCLOSURE

The present disclosure relates to methods and apparatus to support sanitary and routine collection of pet refuse. More specifically, the methods and apparatus of the present invention include new pet refuse collection bags, refuse bag dispensing apparatus, and methods of storage and use of the pet refuse bags.

BACKGROUND OF THE DISCLOSURE

Dog owners, who walk their dogs, face the issue of their pet depositing refuse, including pet feces, in locations inappropriate to leave the refuse, such as, a neighbor's yard, public sidewalk or park, a public street, or other location that they walk Other pets may create similar issues. Several methods to collect pet waste have been devised, including: small scoops with or without small rakes; plastic newspaper sleeves, and the use of plastic bags of various types. In an example, a scoop is jostled to slide under the refuse and shaken to settle the matter into the somewhat more secure base of the scoop. Rakes may assist this process, but then require two hands to accomplish the task.

Alternatively, it is known to cover a user's hand with a plastic bag, such that after a pet has relieved themselves, the user may grasp the refuse with their hand covered by the plastic bag, and pull the bag down the forearm and over the hand to encase the refuse, whereupon the bag may be tied.

Obvious reasons indicate that the state of the art is inadequate. For example, the state of the art includes the pet relieving themselves on a ground surface that is not entirely cleaned, even if the pet owner collects the refuse. In addition, scoops and rakes are somewhat awkward to carry, especially after collecting refuse, and require two hands to operate, which is difficult while also holding a pet's leash. Scoops must be emptied, preferably into a bag that can be closed, which introduced the opportunity for a mishap. Also, the scoop and rake need to be sanitized after use. Plastic bags used over a user's hand can be tied and carried, but require the user to endure an unpleasant sensation of grasping the refuse, and handling bags of refuse also presents the opportunity of a mishap creating a mess. Frequently, plastic bags are torn and often provide inadequate protection. Also, these solutions assume a healthy stool is emitted by the pet, and do not provide to easily collect and transport loose stool, since a higher liquid content is difficult to pick up, especially while holding leash and managing a pet. A better solution for collecting pet refuse is therefore needed.

SUMMARY OF THE DISCLOSURE

Accordingly, the present invention provides apparatus and methods for improved refuse collection and transport The present invention, in some examples, includes a frame that may be manipulated with a single hand of a user while the frame supports a dispensed pet refuse bag in a position conducive to collecting pet refuse and additionally supports undispensed bags and stores a dispensed bag containing pet refuse.

A frame according to the present invention may hold a bag open, and a handle may permit the pet owner to position the open bag directly under the pet as the pet defecates. In this manner, the refuse may be deposited directly into the open bag, which may then be removed from the handle and tied. The bag may be affixed to the handle before departing on a walk, and it and the tied bag are easy to carry home again. In some embodiments, the frame may be provided with a light positioned to illuminate an area of defecation and refuse collection. Still further, in some embodiments, an audio device may be included to emit an audio signal the pet has been trained to associate with a command to defecate. An emitted audio signal may include a frequency that is not discernable by the human ear, essentially allowing a user to indicate to the pet when and where the pet should defecate without having to speak.

Methods of the present invention may include supporting a refuse bag support member with a first handle portion having a first handle portion proximal end and a first handle portion distal end and a second handle portion having a second handle portion proximal end and a second handle portion distal end, and the refuse bag support member is supported at the distal end of the first handle portion and the second handle portion.

A distance may be maintained between the first handle portion and the second handle portion with a first brace and a second brace. A trapezoidal loop may be threaded through a folded sleeve included in a pet refuse bag. The trapezoidal loop may be set at an angle to the first handle portion and the second handle portion. An integrated loop may be positioned in the folded sleeve over a hook fixedly attached to the second brace.

Pet refuse is received into the pet refuse bag and integrated loop may be disengaged from the hook fixedly attached to the second brace and the refuse bag tied closed with the integrated loop.

In some implementations a light supported by the first brace may be actuated to illuminate the refuse bag and/or surrounding area. In some embodiments an audio generator supported by the first brace may be operated to generate a distinct sound ascertainable by a dog.

A soiled refuse bag may be stored in a refuse bag container attached to at least one of the first handle portion and the second handle portion or on a hook attached to at least one of the first handle portion and the second handle portion.

In another aspect, the soiled refuse bag may be removed from a position nested in a clean pet refuse bag; or a position alongside another pet refuse bag and unfolding a clean pet refuse bag into the position on the trapezoidal loop.

A pet refuse collection apparatus may include a first handle portion having a first handle portion proximal end and a first handle portion distal end. The apparatus may further include a second handle portion having a second handle portion proximal end and a second handle portion distal end, said second handle portion proximal end joined to the first handle portion proximal end with a span between the first handle portion distal end and the second handle portion distal end. A first brace and a second brace may be included with each of the first brace and the second brace fixedly attached to the first handle portion and the second handle portion and maintaining the first handle portion and the second handle portion at a set position relative to each other, the first brace located closer to the first handle portion distal end and the second handle portion distal end than the second brace.

A trapezoidal loop may be fixedly attached to the first handle portion and the second handle portion with a hook fixedly attached to the first brace and extending into the trapezoidal loop. The hook is preferably sized and positioned to engage a refuse bag integrated loop, while the trapezoidal loop supports the refuse bag with a first refuse bag support and a second refuse bag support.

The apparatus may furthermore include a first integrated loop access cutout and a second integrated loop access cutout providing access to a sufficient amount of the integrated loop to tie the refuse bag closed with the integrated loop. The first handle portion may be maintained generally parallel to the second handle portion.

In some embodiments a light may be fixedly attached to one or both of the first brace and the second brace and operative to illuminate the refuse bag and the trapezoidal loop when it is in a lighted state. An audio generator may be included and for example, be supported by the second brace, the audio generator is operative to generate an audio wavelength discernable by a dog.

BRIEF DESCRIPTION OF THE DRAWINGS

The accompanying drawings, which are incorporated in and constitute a part of this specification, illustrate several embodiments of the disclosure and, together with the description, serve to explain the principles of the disclosure:

FIG. 13, 13A, 13B illustrate an exemplary flow chart of method steps that may be performed in some embodiments of the present invention.

DETAILED DESCRIPTION

The present disclosure provides generally for apparatus of a refuse collection system with disposable bags that may facilitate the collection of the refuse. According to the present disclosure, the refuse collection apparatus may provide a novel solution to collecting, storing, and disposing of a pet's refuse. There may be numerous additions to make the device further useful. And there may be numerous methods for using the pet refuse collection.

In the following sections, detailed descriptions of examples and methods of the disclosure will be given. The description of both preferred and alternative examples though thorough are exemplary only, and it is understood that to those skilled in the art that variations, modifications, and alterations may be apparent. It is therefore to be understood that the examples do not limit the broadness of the aspects of the underlying disclosure as defined by the claims.

Figure 1:
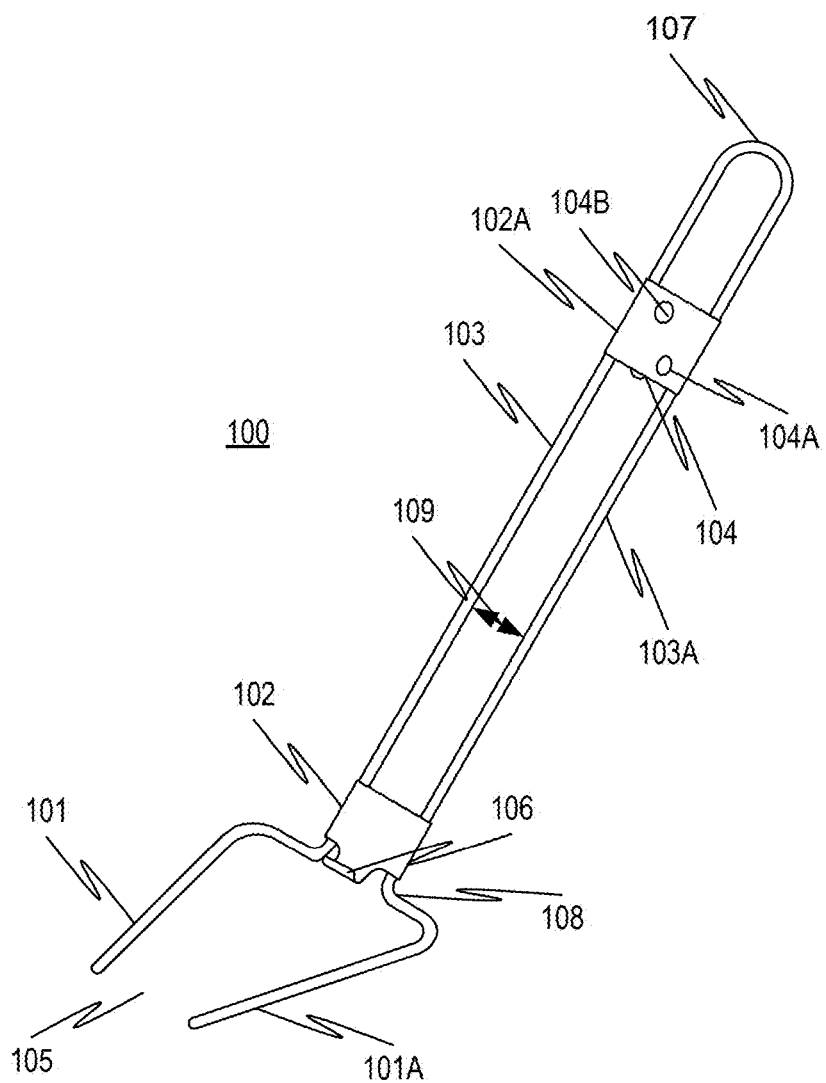
FIG. 1 illustrates an exemplary front view of a wire frame of a refuse collection apparatus.

Referring now to FIG. 1, a refuse bag support apparatus 100 is shown with an exemplary first refuse bag support member 101 and second refuse bag support member 101A may be shaped into a trapezoidal loop 105 for receiving a refuse bag (not shown in FIG. 1). The bag support members 101-101A may be fixedly attached to a first handle portion 103 and a second handle portion 103A connected together at a proximal end 107 and separated at a distal end 108. As illustrated, the first handle portion 103 and the second handle portion 103A are formed from a contiguous piece of material, such as for example, a single metallic construct or a single plastic extrusion, or a three dimensional printed item. In other embodiments, the bag support member 101, including the first handle portion 103 and a second handle portion 103A may include multiple disparate pieces fixedly or removably joined together.

One or more braces 102-102A may maintain the first handle portion 103 and the second handle portion 103A in position relative to each other. As illustrated, a first brace 102 may be located at the distal end 108 and maintain the first handle portion 103 and the second handle portion 103A generally parallel to each other at a set distance, however other embodiments may include the first brace 102 located at the distal end 108 and maintaining the first handle portion 103 and the second handle portion 103A in a converging position or diverging position.

A second brace 102A, may be positioned closer to the proximal end 107 than the first brace 102 and bridge a span 109 between the first handle portion 103 and the second handle portion 103A. The second brace 102A, may provide stability between the first handle portion 103 and the second handle portion 103A.

A refuse bag support 105 is fixedly attached to the distal end of the first handle portion 103 and the distal end of the second handle portion 103A. In some embodiments, the refuse bag support 105 may be formed of a same item as the first handle portion 103 and the second handle portion 103A, such as a single portion of a metallic material (or a plastic material) formed into a shape that includes each of the first handle portion 103 and the second handle portion 103A and the refuse bag support. In some embodiments, the refuse bag support 105 may be formed into a trapezoidal shape that includes a convex quadrilateral with parallel sides, include arcuate portions, be generally rectangular, be generally oval, or other shape that is conducive for holding a refuse bag in an open configuration.

The second brace may also secure a device, such as, by way of non-limiting example, a light 104 and an audio generator 104A. A light may serve for one or both of: a safety beacon during nighttime walks, and to illuminate the refuse bag support member 101 during use. A user control 104B allows a user to turn one or both of the light 104 and the audio generator 104A on and off. Whereas service dogs such as guiding eyes dogs are trained to defecate upon a spoken command, in some embodiments, an audio signal may be emitted by the audio generator to signal to the pet that it is time to defecate. Various embodiments may include an audio signal that is ascertainable by the human ear, or that has a frequency the dog may ascertain, but is silent to humans. In some embodiments, a light signal may accompany the audio signal emitted by the audio generator 104A.

A narrowed end of the refuse bag support members 101-101A, such as the one illustrated, may be formed into a generally trapezoidal loop 105 to facilitate attachment of a bag to catch and contain pet refuse. The first brace 102 between the first handle portion 103 and the second handle portion 103A may stabilize the first handle portion 103 and the second handle portion 103A and an attached refuse bag (not illustrated in FIG. 1). The first brace may include a hook 106 to hold the handle tie of the bag to keep the bag open and securely attached to the handle. The trapezoidal loop 105 may be laid close to the ground, such that the handle portions 103-103A are angled upward for convenience and control. A taper of the trapezoidal loop 105 may facilitate use with dogs (or other pets) of different sizes.

The handle portions 103-103A may be formed from various materials, such as, for example, a metallic frame of metals such as aluminum, copper, or steel may be formed into the shape as shown, or one which can support a handle and a region to hold a bag under an animal. In other examples, a metallic frame may be coated with materials of various kinds and for different functions, such as for protecting the frame from fluids and for making it difficult for fluids or solids to adhere to the frame. Some coatings may also facilitate the cleaning of the apparatus such as hydrophobic coatings of Teflon, plastics, or surface treatments with materials such as fluoropolymers. In some examples, the base support material may be formed of materials other than metal, such as, in a non-limiting sense, plastics, wood, and cellulose fibers in papers, cardboards, and the like from composite materials, including these materials mixed with a polymeric material.

Figure 2:
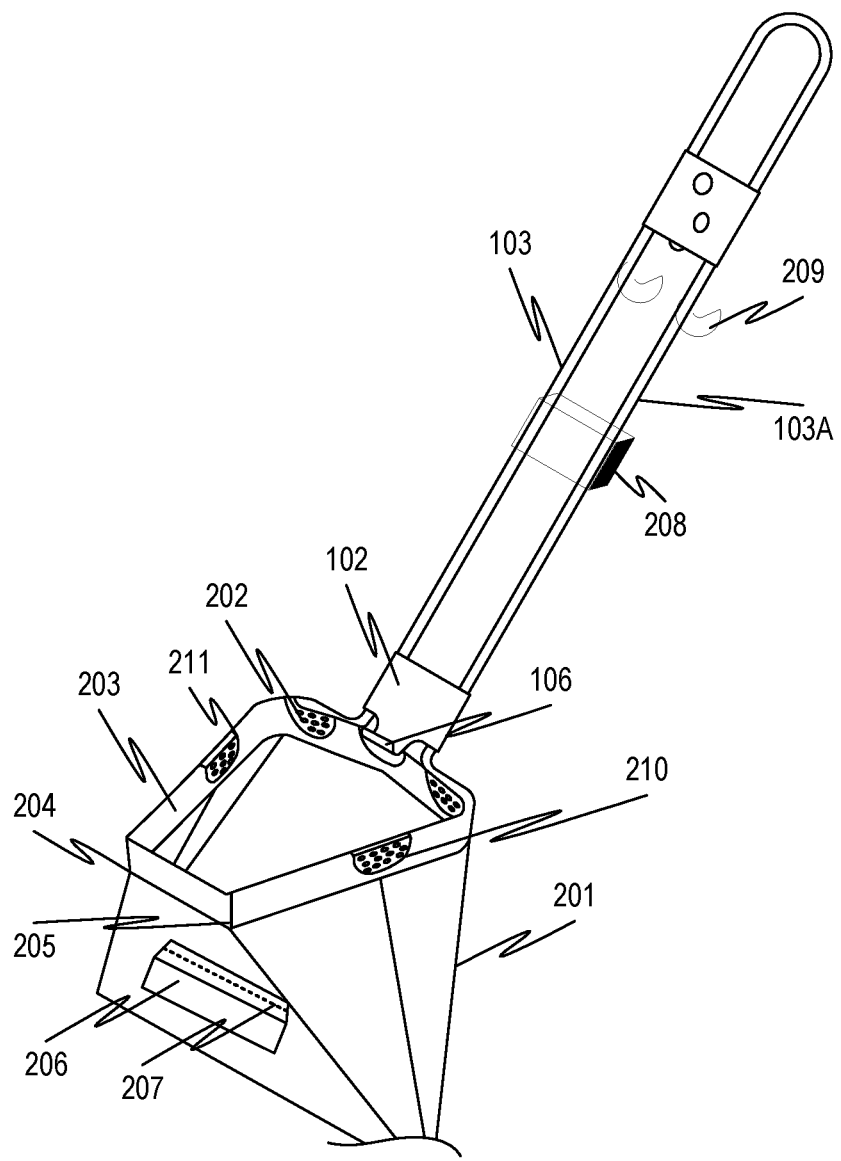
FIG. 2 illustrates an exemplary front view of a wire frame of a refuse collection apparatus with an associated draw string bag.

Referring now to FIG. 2, the refuse bag support apparatus 100 is illustrated with an exemplary disposable refuse bag 201 attached. The refuse bag 201 may be formed from one or more of: oil based plastic, coated paper, coated fiber, biodegradable plastic, or other suitable material. A specialized refuse bag 201 may have one or more integrated loops such as 202, 210 or 211 through a folded sleeve 203 around the top of the bag. The sleeve has one or both of a first seal 204 and a second seal 205 to assist with proper placement of the refuse bag 201 on the refuse bag support apparatus to prevent the bag from being pulled too far around the trapezoidal loop. The loop may be used to pull the bag open and to pull it taut around the loop. The bag may be further fixed to the refuse bag support apparatus 100 by putting the loop 202 over the hook 106 on the first brace.

A refuse bag pouch 206 may be formed into, or attached to, the refuse bag 201 and include a sealant strip 207. The pouch may be fixed to receive the refuse bag 201 and pet refuse once the refuse bag 201 has been used. The sealant strip 207 may seal the refuse bag 201 with the refuse contained therein. In some embodiments, a container 208 may be mounted between the first handle portion 103 and the second handle portion 103A and be of suitable size to store a used refuse bag 201. Some embodiments may also include a refuse bag storage hook 209 mounted on one or both of the first handle portion 103 and the second handle portion 103A. A used refuse bag may be hung on the refuse bag storage hook 209.

The refuse bag 201 may be fashioned from any appropriate material for catching and containing pet refuse, such as oil based plastic, biodegradable plastic, coated or impregnated paper based material, and the like. The integrated loop may include, for example, a paperband, nylon or and/or plastic. A plastic material which is impervious to liquids and vapors penetrating may be an ideal choice, but other alternatives may include papers and coated papers, fibers and coated fibers, and the like.

Figure 3:
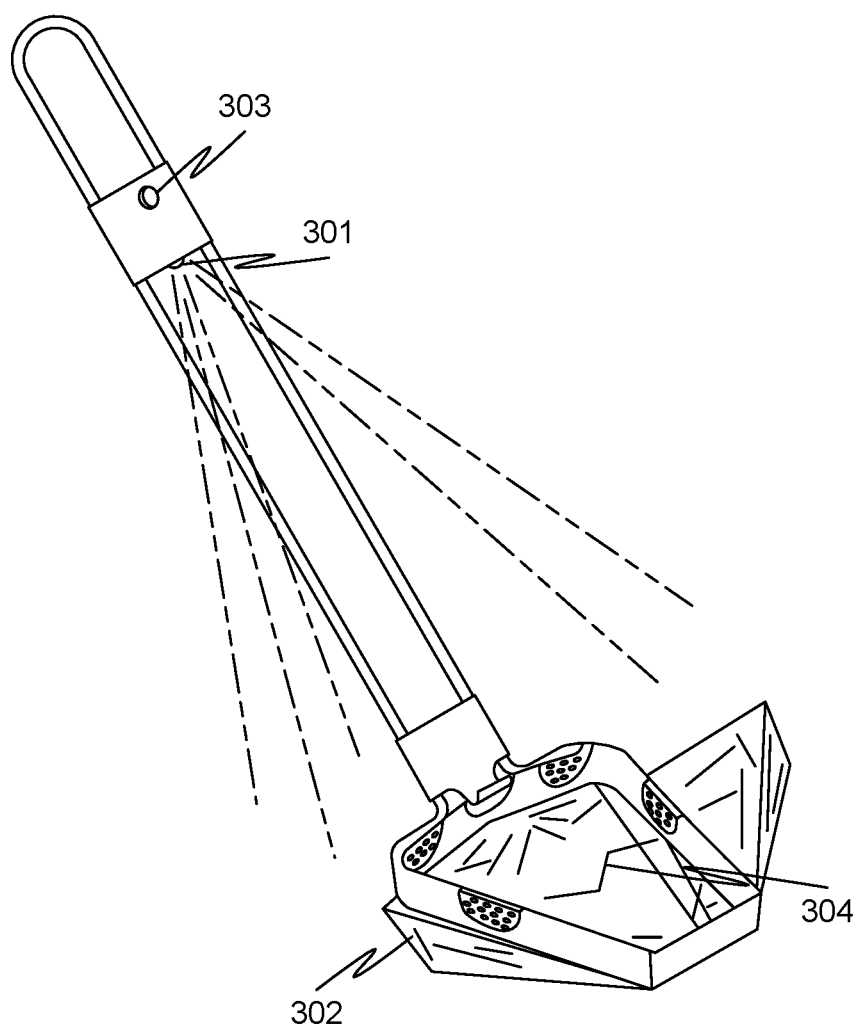
FIG. 3 illustrates an exemplary front view of a wire frame of a refuse collection apparatus with an associated draw string bag in some aspects of use.

FIG. 3, an illustration, shows an exemplary state of the apparatus and bag as they might appear when positioned under the dog. In the example, the opening of the bag 304 is held open while the fullness of the bag is collapsed 302 in contact with the ground. In some examples, pressing the button 303 on the light 301 illuminates the open bag, and the dog as well, when used in the dark. The light may contain a battery element, or a battery element may be contained elsewhere on the structure of the apparatus with wires running between the battery, the switch, and the light.

In an example, after the dog has finished and walks away, the handle and bag may be lifted from the ground, whereupon the refuse settles into the bottom of the bag. The owner may then release the loop from the hook. In further examples of the use, with an upward tug angled away from the handle, the bag is gathered at the top and slides off the open side of the loop. A few up and down jerks of the handle serve to close the bag more completely. The bag can then be carried by its loop, place in the refuse bag container 208 or hung on the refuse bag storage hook 209.

If a user wishes to seal the bag before disposal, the owner may place the bag on a surface and fold the top over. There may be other means of sealing including the attachment of adhesive materials, adhesives with removable strips, snaps, clasps, and other means of sealing. In some examples, the user may grasp the loop from opposite sides, and the two resulting loops can be used to tie the neck of the bag securely.

A Single-Handle Drawstring Refuse Bag

An exemplary drawstring refuse bag may have features that largely define the concept of a package to receive and transport refuse.

Figure 4C:
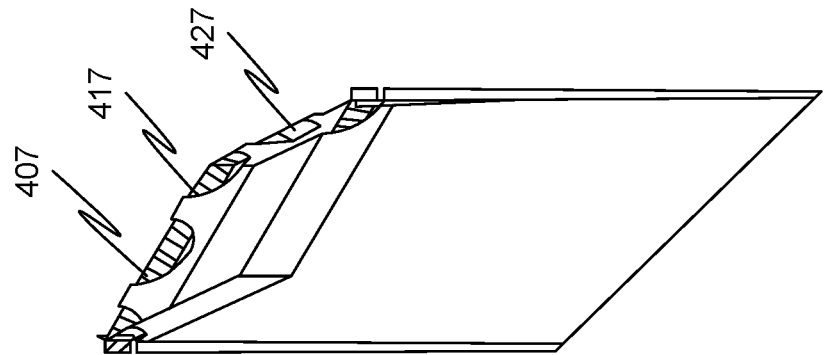
FIG. 4A, FIG. 4B, and FIG. 4C illustrate exemplary versions of refuse collection bags.
Figure 4B:
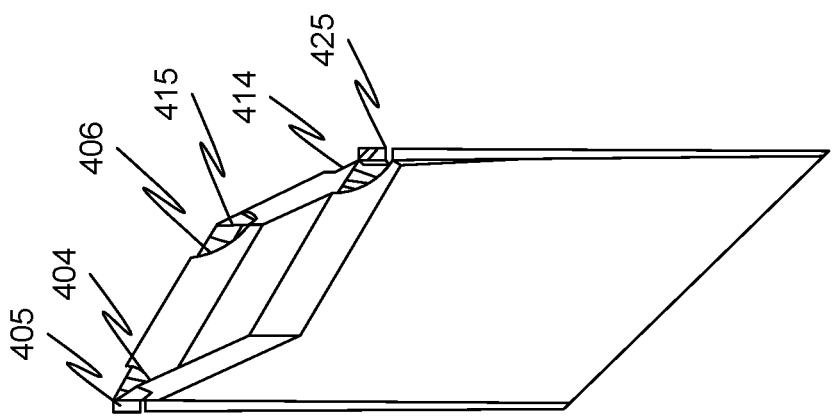
Figure 4A:
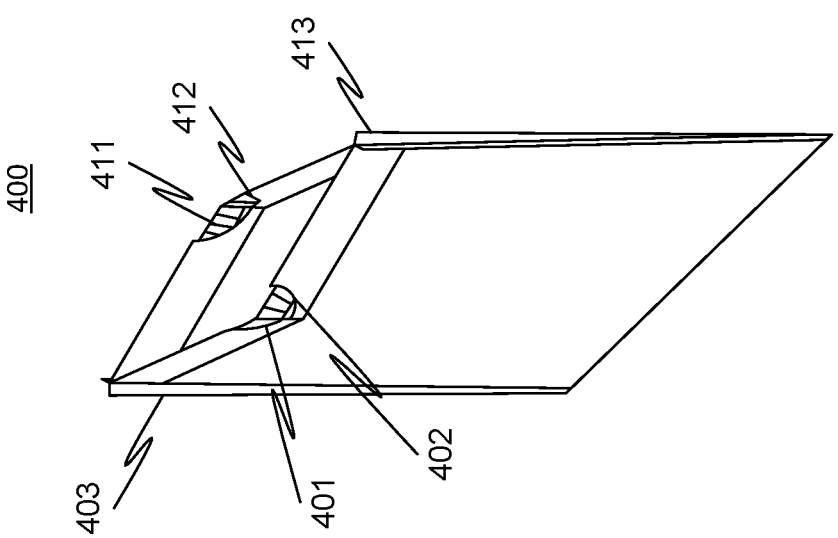

Examples of a refuse bag 400 according to the present invention with various features of interest are detailed in FIGS. 4A, 4B, and 4C. In FIG. 4A, the handles 401 and 411 are accessible through notches 402 and 412, respectively, cut in the hem of the bag on opposite sides. The process by which these bags are manufactured secures the handles to the edge seam 403 of the bag. This design may encourage closure by pulling the handles 401, 411 away from each other which has the effect of gathering the hem of the bag such that points 403 and 413 approach each other until the hem is completely gathered to close the bag. Whereupon the two handles are tied together in knots of various types to prevent the bag from opening again. This secure closure method is convenient, intuitive, and effective at containing the contents as well as their odors, for the most part. One or both of the handles 401, 411 may be used to carry a used bag.

In some examples, a refuse bag 400 may be made of a single sheet of plastic and two ribbons. Produced in a continuous manner, the material is laid flat, notches 402 and 412 may be punched along the long edges, the handle ribbons 401 and 411 are placed parallel to the opposite long edges, and the hems are folded over the ribbons and heat-sealed. The refuse bag 400 may be finished by folding the long strip of material lengthwise, so the holes and hems are aligned and the edges of each bag and the next in line are heat sealed. The handle ribbons may be secured at 403 and 413 by the edge heat seal. A perforation may be made simultaneously, by which each bag may be separated from the next either prior to packaging, or by the consumer as they are drawn from the package.

FIGS. 4B and 4C are exemplary variations of the bag of FIG. 4A. In FIG. 4B, openings in the bag at 404, 406, and 414 allow for access to various points 405, 415, and 425 of the draw string at multiple corners of the bag. Alternatively, in FIG. 4C, 407, 417, and 427 may provide multiple points to grasp the draw string from a single side of the bag.

Figure 5B:
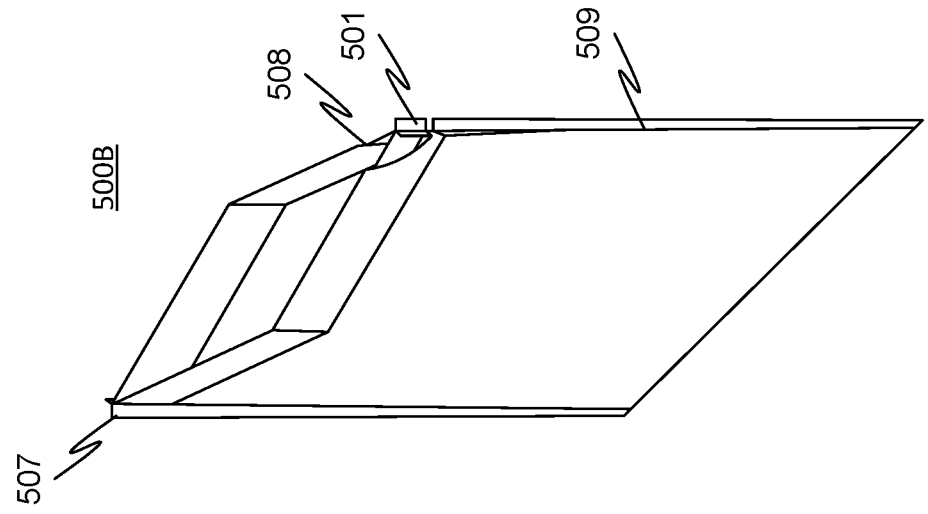
FIG. 5A, FIG. 5B, FIG. 5C, and FIG. 5D illustrate exemplary single-handed versions of refuse collection bags.
Figure 5A:
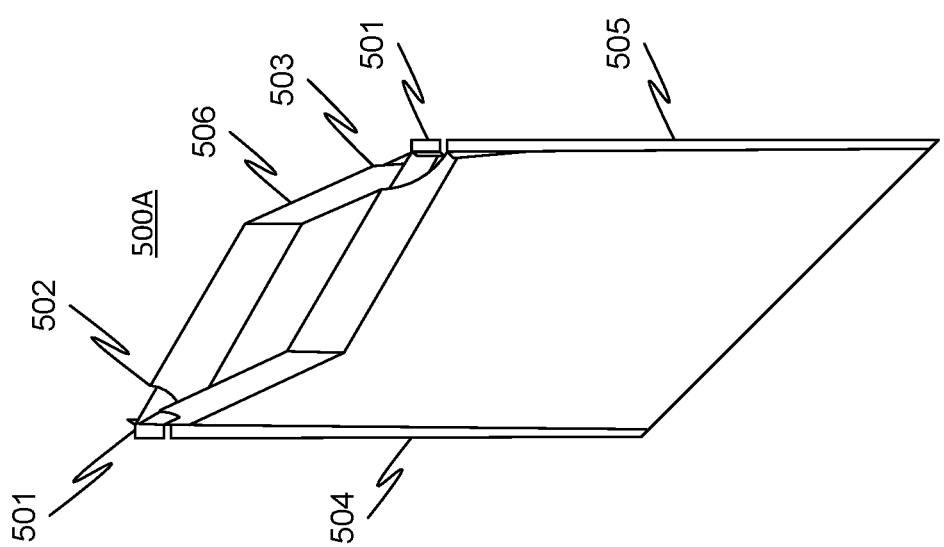

Referring now to FIG. 5A, an example of a single-handle refuse bag 500A is illustrated. There may be advantages in some uses with the apparatus described herein for such a single-handle refuse bag, which may be manufactured in a similar manner to that of two-handle bags, but with a rearrangement of some features. A first cutout 502 and a second cutout 503 may be positioned at a first edge 504 and a second edge 505 of the single-handle refuse bag 500A. This single-handle refuse bag 500A permits the handle ribbon 501 to be formed by heat sealing two pieces of ribbon together, thereby forming a continuous handle ribbon 501 loop that is free to slide through the hem 506. Grasping exposed ribbon 501 at either edge allows the ribbon 501 to be pulled, which thereby closes the single-handle refuse bag 500A with one hand. This configuration may have the added advantage of adapting the methods of using a pet refuse apparatus with either a one or two handle functionality.

FIG. 5B illustrates another exemplary configuration of a single handed refuse bag 500B, in which only one cutout 508 is illustrated. The exemplary cutout 508 illustrated at the cutout edge 509 allows handle ribbon 501 to be sealed into an opposite edge 507 leaving ends of the handle ribbon 501 exposed at the hole. In a heat sealing step, the handle ribbon 501 may be formed via a heat seal that joins separate pieces of ribbons into the handle ribbon 501. Pulling the exposed point of the handle ribbon 501 at cutout 508 serves to gather and close the refuse bag 500B.

Figure 5D:
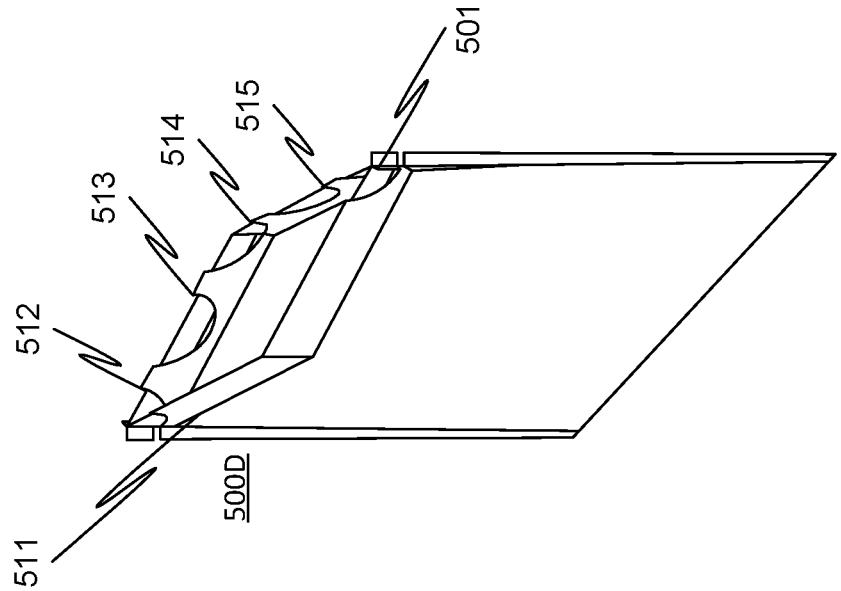
Figure 5C:
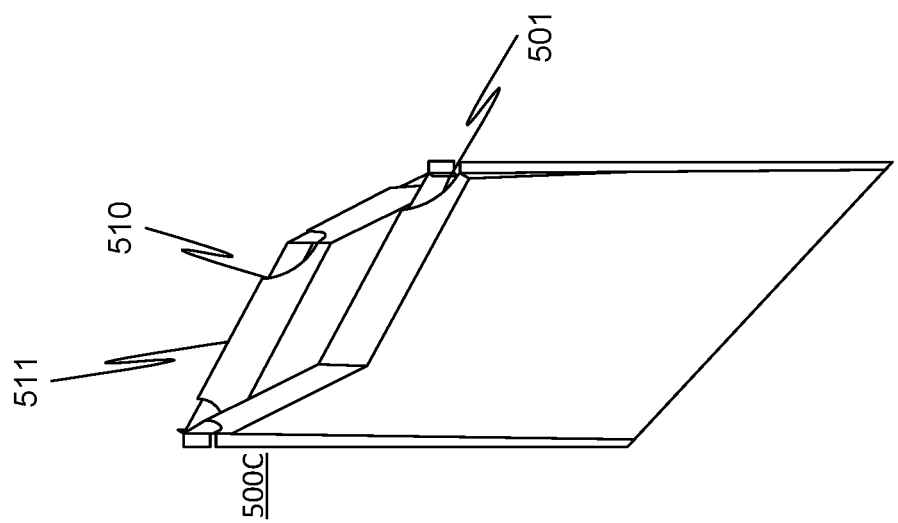

FIG. 5C illustrates another exemplary configuration of a single handed refuse bag 500C augmented with a center cutout 510 cut in a generally center portion of a first hem 511. Heat sealing may form the first hem 511. Heat sealing may also join multiple pieces of ribbons into a continuous loop of handle ribbon 501. The single handed refuse bag 500C may be closed by drawing the handle ribbon 501 out of center cutout 510. One advantage of this configuration may be that the arrangements of notches and heat seals may be altered to suit various uses of single-drawstring bags whose function may be enhanced by the orientation of the bag's geometry.

FIG. 5D illustrates a single handed refuse bag 500D with another variation, wherein a first hem 511 includes multiple cutouts, including, for example, first cutout 512, second cutout 513, third cutout 514, and fourth cutout 515 that provide a user with multiple options for collecting and sealing refuse in the single handed refuse bag 500D.

A single handed refuse bag 500D, constructed in any of these configurations, may be useful for multiple cycles of closure and opening, and is useful for gathering items that one wishes to remove from the bag, such as a wet bathing suit, laundry collected on a trip, etc. These uses are best served if the handle is not tied around the opening.

However, it may be possible to close the single handed refuse bag 500D even more securely than one can close a two-handle bag. In closing the single handed refuse bag 500D, a user may gather the hem of the bag by pulling the single handle, and fold the neck of the bag over, but not far enough to overlap the contents. Then with the neck folded away, the user may grasp the single handle from both sides of the folded neck and pull in opposite directions to form two handles which can be wrapped around the neck of the bag and tied with a variety of common knots. The effect of constricting the bag material may create a significantly more secure and leak resistant closure than may be achieved simply by securing the gathers of the two-handle bag.

When collecting materials that are more unsettling than household or commercial trash, a single handle bag may provide numerous advantages. A more reliable bag, such as a draw string trash bag sized for the particular purpose, may create a better user experience for a pet owner, and a one handle bag may be superior to a two handle bag in some examples, even though both types may be used with the pet refuse apparatus.

Methods of Forming Bags for Use with Pet Refuse Apparatus

Figure 6:
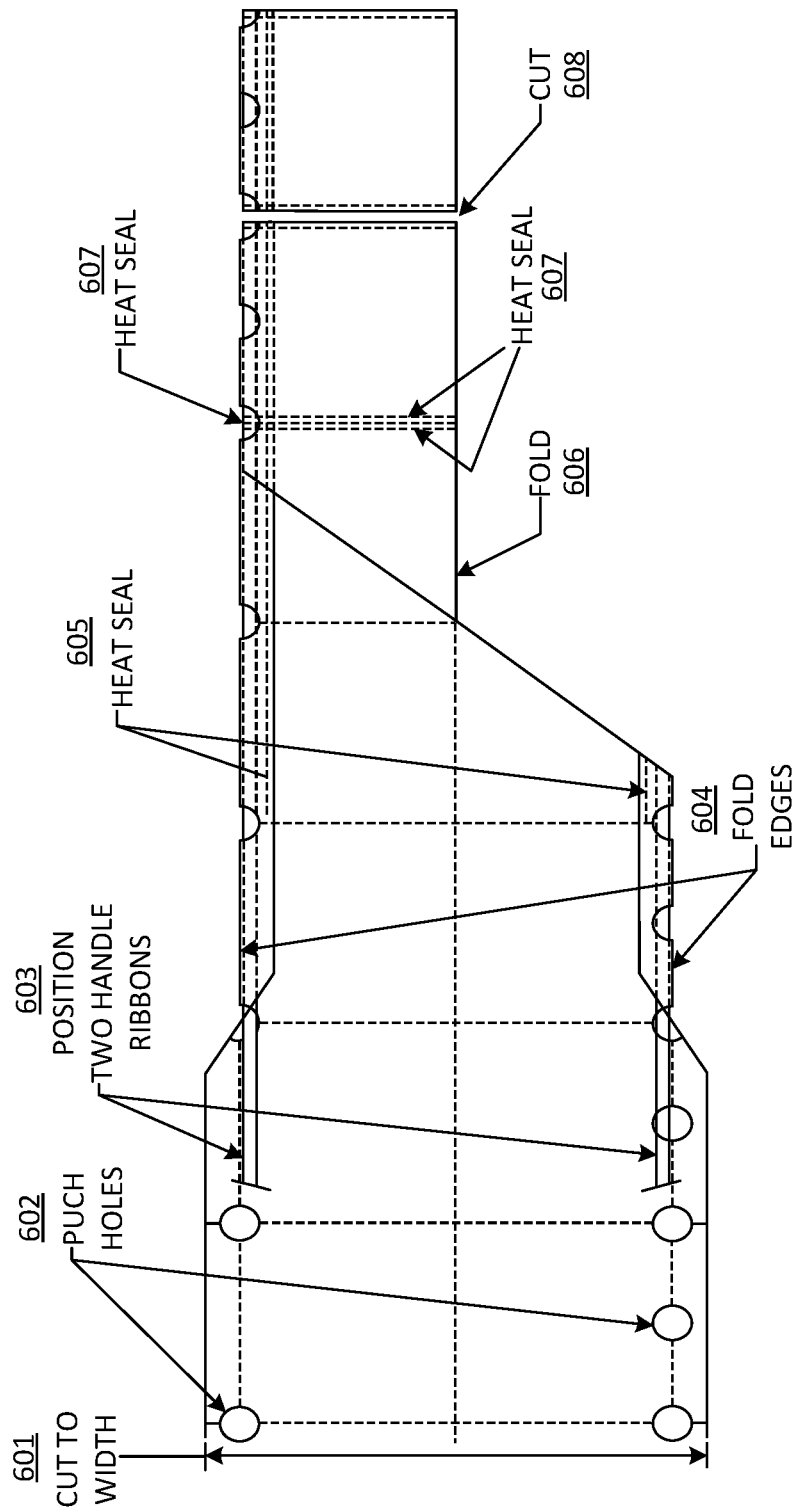
FIG. 6 illustrates a schematic view of an exemplary process flow to make refuse collection bags.

Referring now to FIG. 6, an exemplary process for forming one and two handle bags useful for the processes and apparatus disclosed here is illustrated. At step 601 a material of the bag, such as a plastic sheet in the example may be cut to a desired size. At step 602, holes consistent with one of the various design options may be punched into the bags. At step 603 ribbons consistent with the handle design may be positioned. At step 604, edges of the material may be folded over. At step 605, a heat sealing process may seal the folded edges together with material of the body of the bag, in doing so, creating a pocket that the ribbons are contained in. At step 606, the bulk structure may be folded over creating both sides of the bag. At step 607, another heat sealing process may create seals between the bags. And, at step 608 a cutting process may separate individual bags consistent with the process and apparatus as disclosed herein.

Perforated Bags

Figure 7:
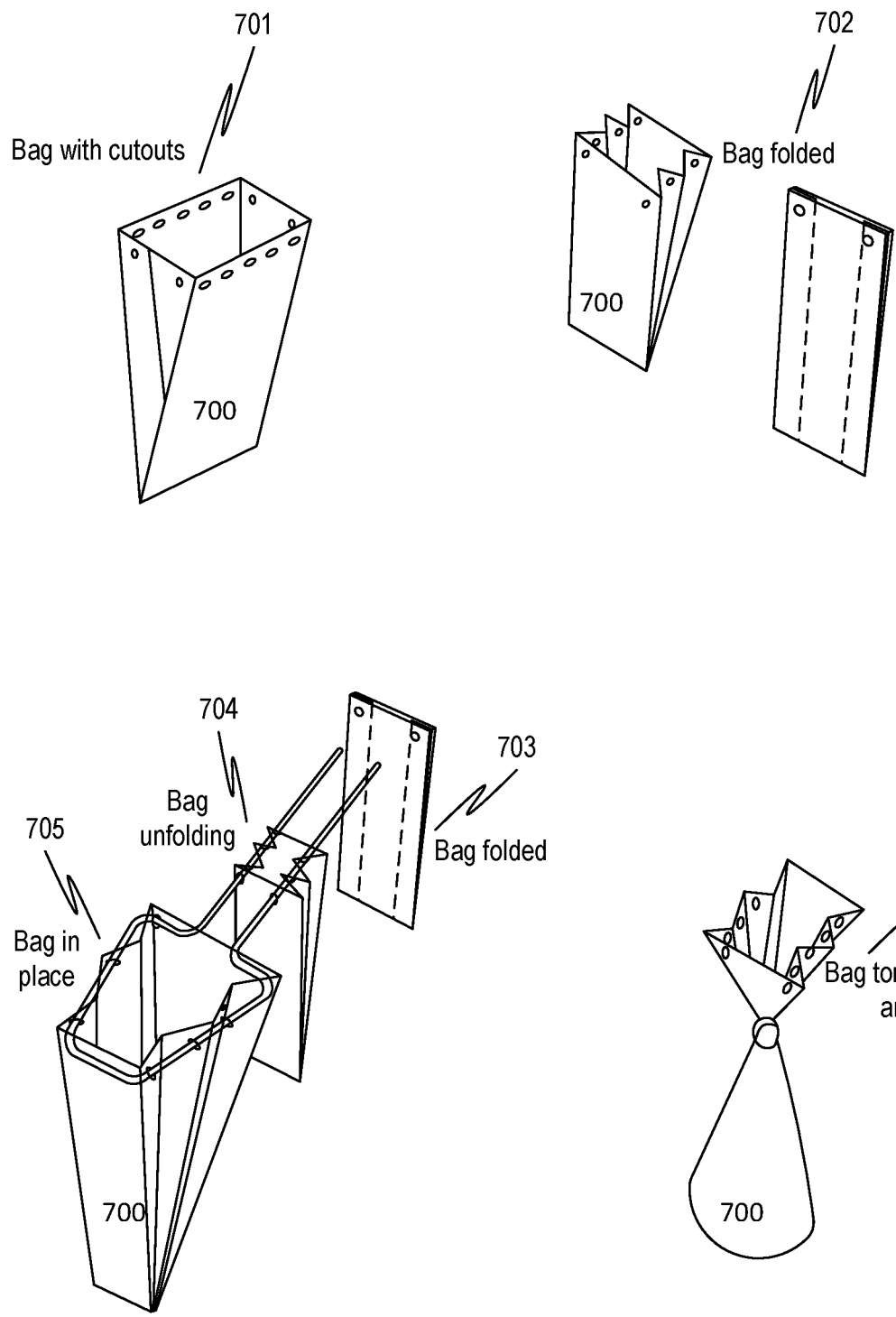
FIG. 7 illustrates a schematic view of a refuse bag including perforations to support unused bags on a handle for refuse bags.

Referring now to FIG. 7, a process of folding and dispensing a single handed refuse bag 700 is illustrated. The handle, which may or may not include a light and/or audio generator, and may or may not include a compartment for additional bags, is attached to the wire handle and loop. The wire handle is retained in the grip by any common mechanism including friction or detents. In some examples, at 701 a bag 700 with a series of cutouts around the bag 700 opening, such that the cutouts may be removed from the loop of the handle by gathering the neck of the bag 700 in one's fist and pulling downward to tear through the margin. A bag 700 of sufficient depth may then be closed by tying the neck of the bag in a knot. The bag 700 is attached to the handle by first removing a molded or fabricated grip from the open end of the handle. At 702, the bag 700, having been folded accordion-style, may be easily slipped onto the handle by threading half of the aligned holes onto each rod. At 703, a bag 700 is folded and hung on a first handle portion and a second handle portion. At 704, the bag 700 is unfolded and at 705 the bag 700 is arranged around an ovoid shape 705 of a loop at the bottom of the handle.

The weight and material of the bag, and hence its strength to resist tearing, are selected such that the plurality of holes is sufficient to suspend the anticipated weight of a large dog's stool, but is to be weak enough to be conveniently torn 706 to remove the bag from the handle.

Figure 8:
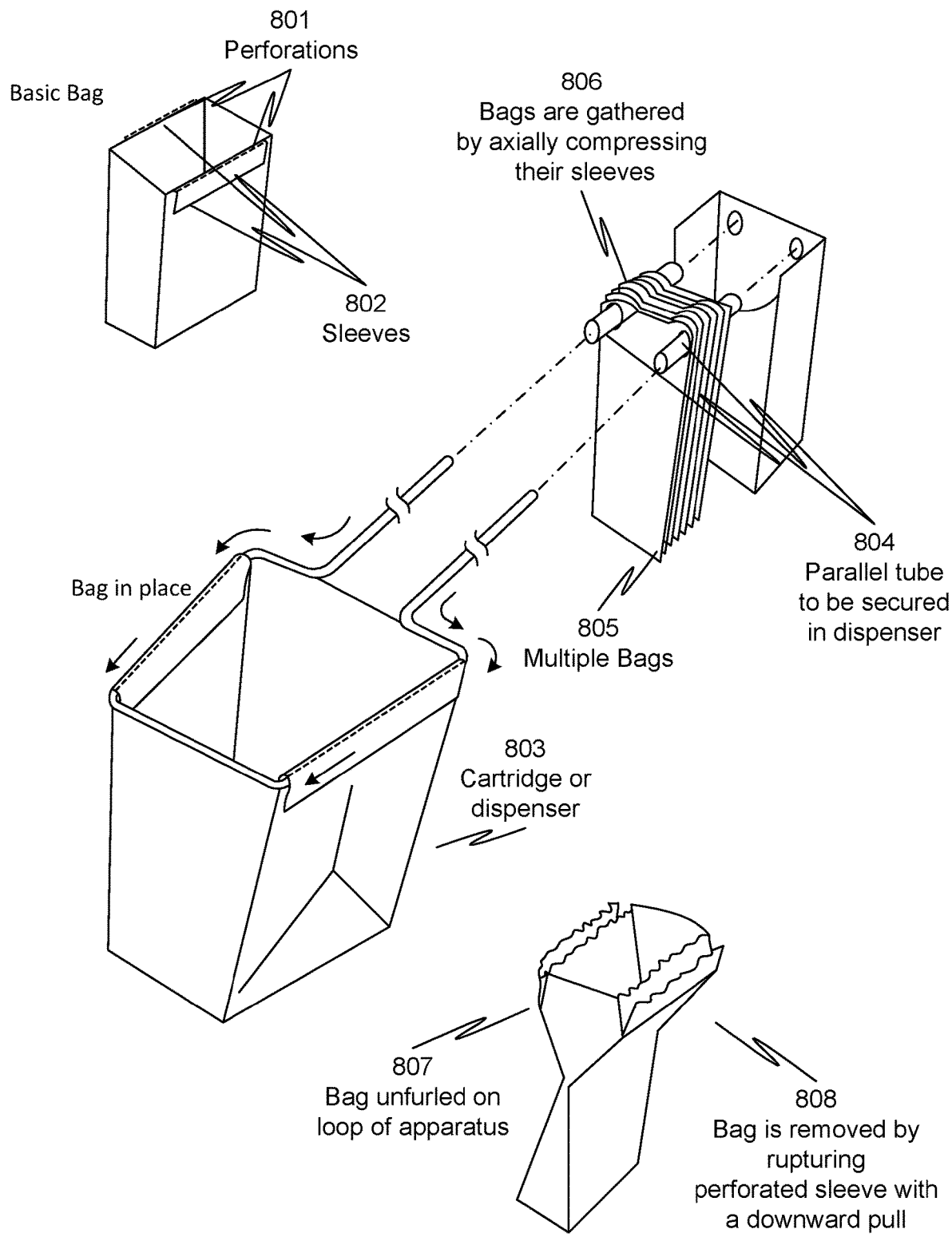
FIG. 8 illustrates a schematic view of a cartridge of refuse bags that may be supported via a handle for refuse bags.

Referring to FIG. 8, another example of a process to use a single handed refuse bag with a tear-through sleeve is illustrated. As illustrated in FIG. 8, single handed refuse bags of minimal strength and thickness may have sleeves 802 along opposite sides of their openings. The sleeves may be perforated 801 along their length. In use, each sleeve of a bag may be threaded onto each side of the wire handle and loop such that the opened bag hangs 807 from its sleeves. The bag may be removed 808 from the handle and loop by grasping its neck in one's fist and pulling downward to rupture the sleeve along the perforations. Closure may be accomplished by tying the neck of the bag in a knot.

In some examples, the bag may be packaged in a box 803 of multiple bags 805, containing two tubes over which the sleeves of the bags may be threaded. The box, once a portion of it is torn away to reveal one end of the parallel tubes 804, may be threaded onto the wire handle and secured by a cast or fabricated grip. The top hem of the first bag can be withdrawn 806 from the box and the axially compressed length of its sleeves extend and slide down the handle to suspend the open bag from the loop.

Figure 9:
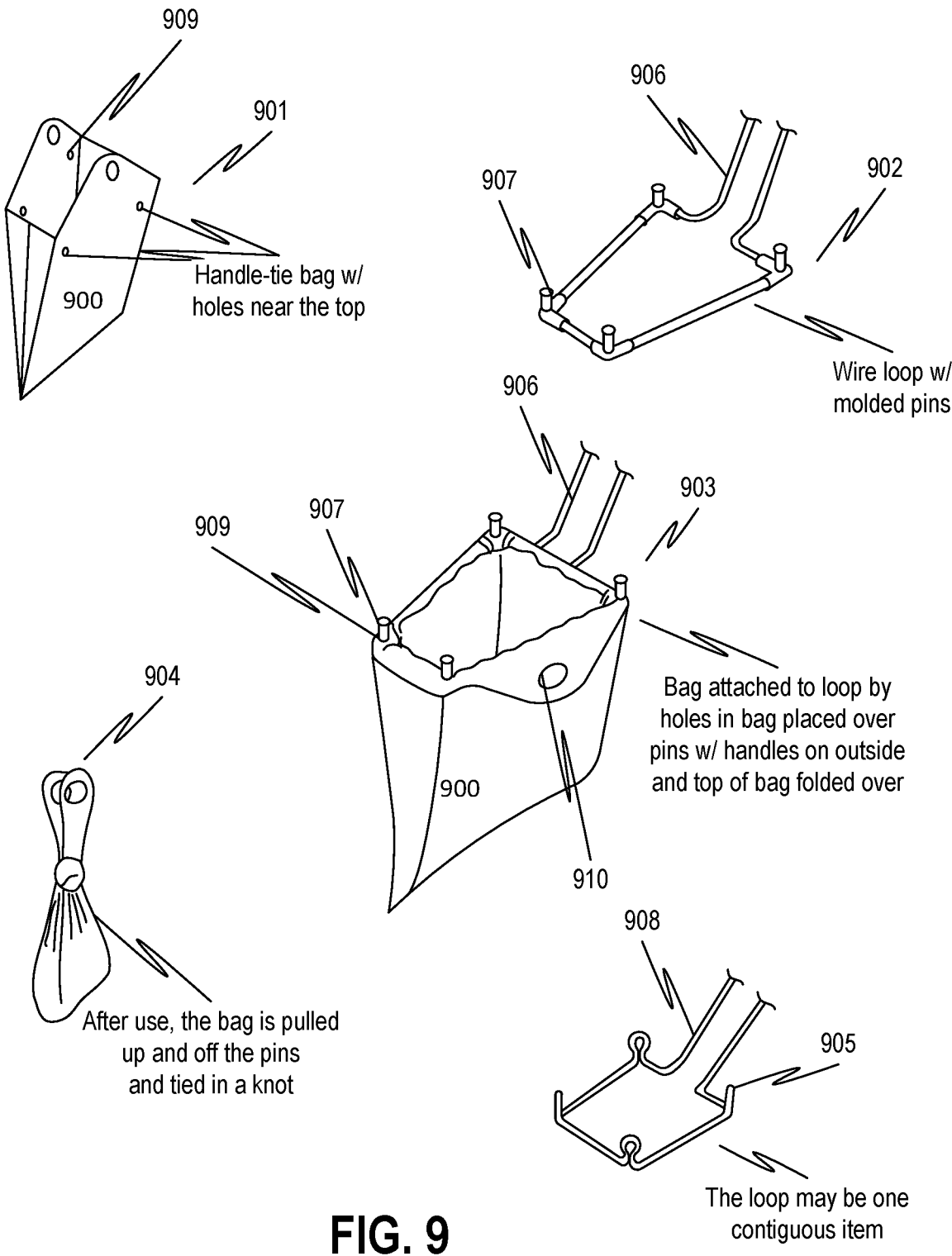
FIG. 9 illustrates a refuse bag with handle ties and holes supported by a refuse bag holder.

Referring now to FIG. 9, an exemplary process with a pin-secured single handed refuse bag 900 is illustrated. At 901, a single handed refuse bag 900 is illustrated with a plurality of holes 909 at specific locations around the opening in the single handed refuse bag 900.

At 902, the holes 909 correspond with upwardly-pointing pins 907 around portions of a wire loop 906.

At 903, single handed refuse bag 900 may be dropped through the loop 906 and corresponding holes 909 in the single handed refuse bag 900 and may be pushed down over a corresponding pin 907. The pins 907 may be provided with a slightly bulbous head over which the hole 909 must stretch. The stretch of the hole 909 over the head of the pin 907 prevents the single handed refuse bag 900 from slipping free accidentally. The single handed refuse bag 900 may also be provided with one or more openings 910 that serve as bag handles. The openings 910 may be folded outside the wire loop when the bag 900 is secured to the pins 907. After use, the bag handles may be pulled upward and provide a means to pull the single handed refuse bag 900 from the pins. The bag handles 910 may be used to close the single handed refuse bag by securing the bag handles 910 in a knot, as shown at 904.

In some embodiments, the pins 907 may be metal welded to a wire frame, or the wire frame itself 908 can be formed to create upwardly pointing loops 905, in which slots or larger holes suitable to fit over the loops would be substituted for the holes in the bag. The pins might also be incorporated in molded plastic corners that are snapped or molded onto a wire frame during manufacture.

Figure 10:
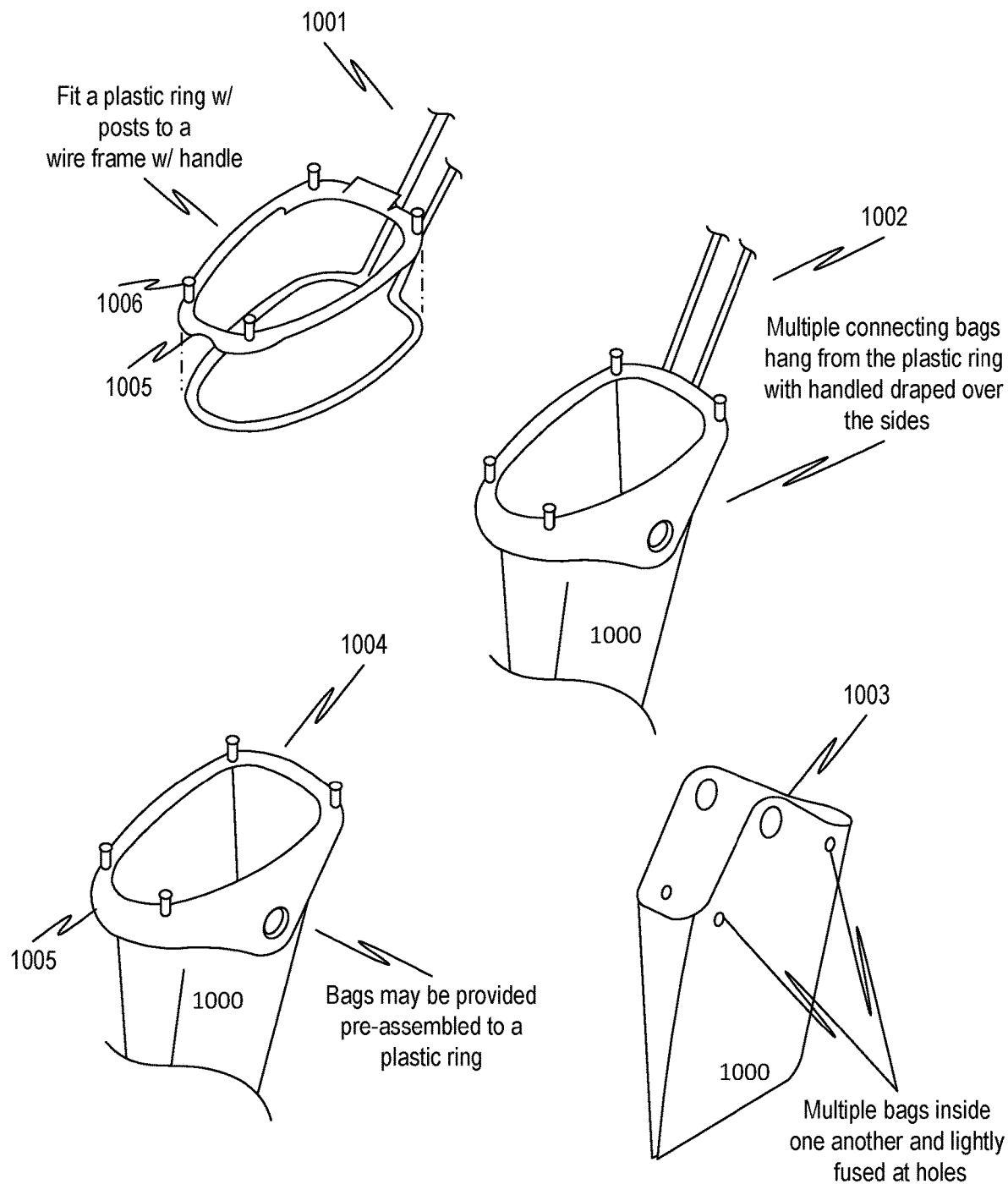
FIG. 10 illustrates additional exemplary embodiments of unused refuse bags nested inside each other and supported by a handle.

Referring now to FIG. 10, another example of a process involving a pin-secured bag 1000 is illustrated. In the alternative embodiment, at step 1001, a plastic ring 1005 is shaped and molded to correspond to and snap onto an ovoid wire loop. The ring 1005 may have upwardly-pointing pins 1006 with bulbous heads at various points around it. At step 1002, multiple concentric bags 1000 may be attached to the ring 1005 by pressing corresponding pierced holes over the pins 1006. In some examples, many bags 1000 may be gathered together one inside the other 1003 to create a single bag 1000 with multiple, but separate, layers.

At step 1003, in some embodiments, the bags 1000 may be pierced simultaneously in such a manner as to lightly fuse them together at the individual holes to facilitate manufacturing and use. Each bag 1000 may be formed with two handles opposite each other.

At step 1004, in some embodiments, a ring 1005 with attached bags may be snapped onto the wire loop with the bags distending downward through the center of the apparatus with the multitude of handles draped downward over the outside of the ring. When a user wishes to remove a bag 1000, handles corresponding with an inward most bag 1000 may be separated from the remainder of bags and pulled upward to rupture the bonds at the holes and pull the bag up and out of the collection 1005, whereupon the handles may be used to tie a knot. The wire component of the apparatus may be durable and reusable. Supplies of the concentric bags may be provided without the plastic ring which may be reloaded. Alternatively, the concentric bags may be provided with the ring attached.

Figure 11:
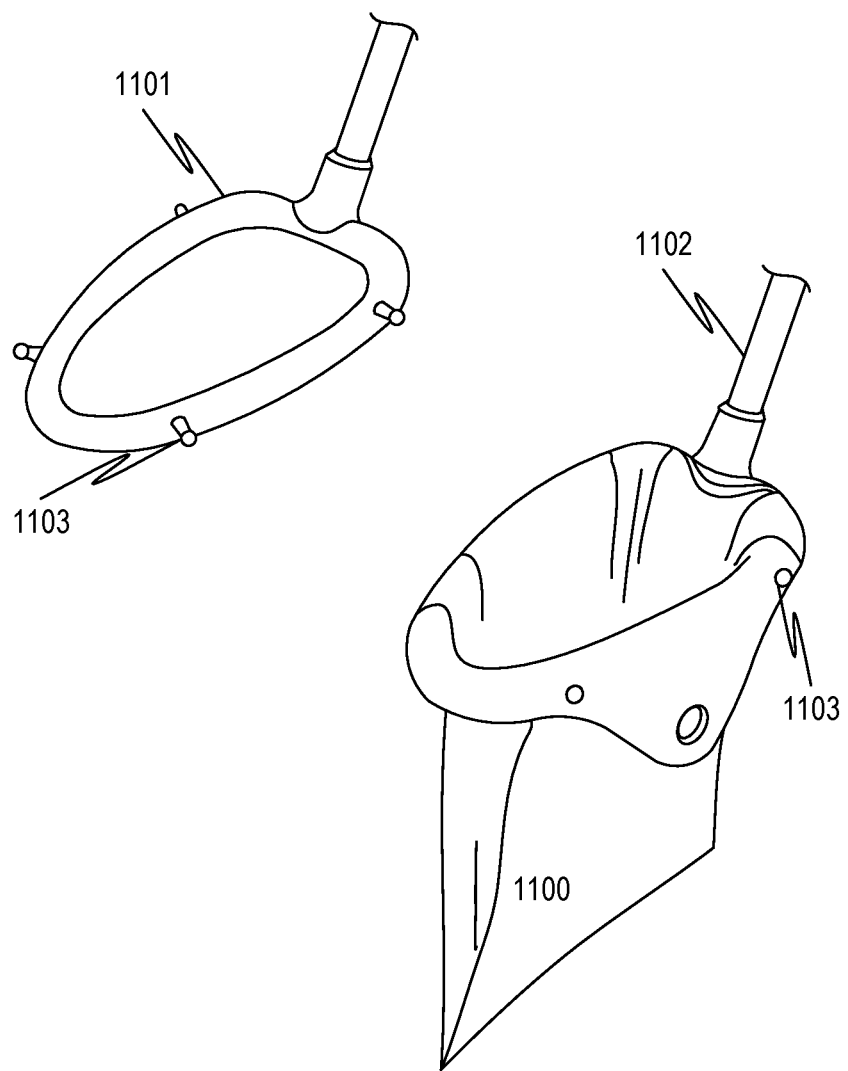
FIG. 11 illustrates additional exemplary embodiments of a refuse collection apparatus.

Referring now to FIG. 11, in some embodiments, a wire framework is replaced by a molded ring 1101 with integral pins 1103. A plurality of concentric bags 1100 may be impaled on the pins and removed individually when used as described previously. A handle stem 1102 may extend up from the molded ring 1101 to a user's hand.

Figure 12:
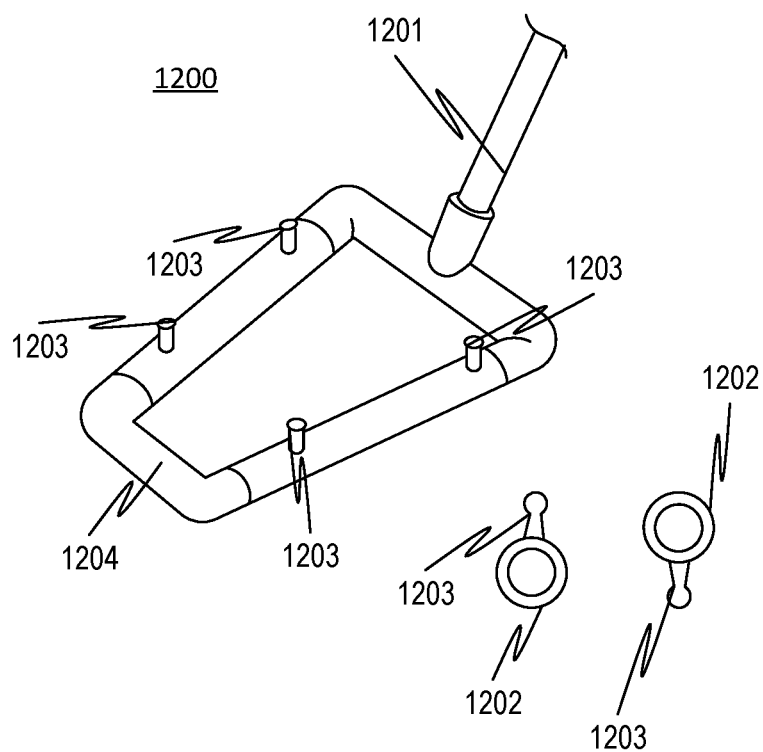
FIG. 12 illustrates additional exemplary embodiments of a refuse collection apparatus.

Referring now to FIG. 12, in some embodiments, a pin and frame configuration 1200 may feature rotating tubes 1202 on either side of the frame 1204 that carry the pins 1203 as illustrated in FIG. 12. The tubes may be rotated to point the pins upward to receive the bags, and then be rotated to point the pins out and down to secure the bags and prevent discomfort for the dog should it make contact in use. This arrangement may include detents and stops that resist and limit the degree of rotation for reliability of the device and bags.

Figure 13B:
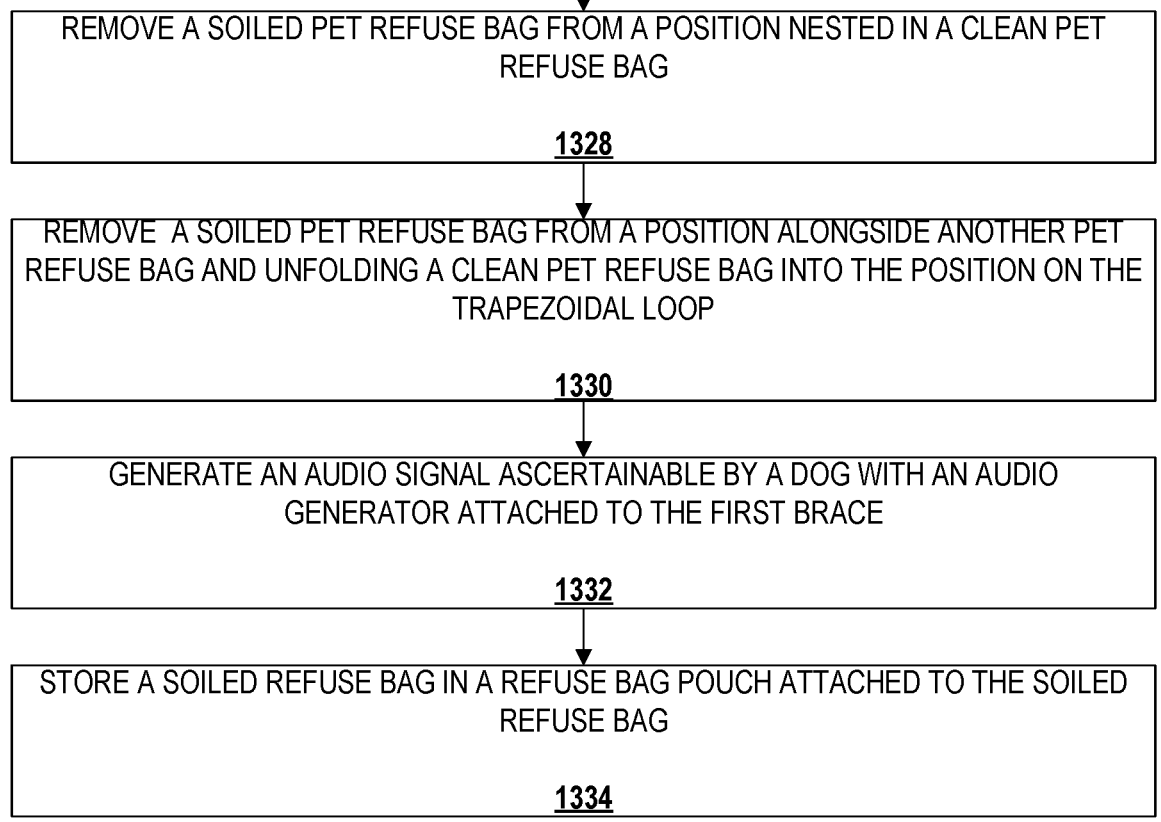

Referring now to FIG. 13 a flowchart of an example process 1300 is illustrated. As shown in FIG. 13, process 1300 may include supporting a refuse bag support member with a first handle portion having a first handle portion proximal end and a first handle portion distal end and a second handle portion having a second handle portion proximal end and a second handle portion distal end, and the refuse bag support member is supported at the distal end of the first handle portion and the second handle portion (block 1302).

A distance may be maintained between the first handle portion and the second handle portion with a first brace and a second brace (block 1304). Process 1300 may include threading a trapezoidal loop through a folded sleeve included in a pet refuse bag (block 1306).

As also shown in FIG. 13, process 1300 may include setting the trapezoidal loop at an angle to the first handle portion and the second handle portion (block 1308).

As further shown in FIG. 13, process 1300 may include hooking an integrated loop positioned in the folded sleeve over a hook fixedly attached to the second brace (block 1310).

Process 1300 may include receiving the pet refuse into the pet refuse bag (block 1312), and unhooking the integrated loop from the hook fixedly attached to the second brace (block 1314). The refuse bag may be tied closed with the integrated loop (block 1316).

In some alternate embodiments, a light supported by the first brace may be actuated illuminating the refuse bag; and/or an audio generator supported by the first brace may be actuated to generate a distinct sound ascertainable by a dog. A soiled refuse bag may be stored in a refuse bag container attached to at least one of the first handle portion and the second handle portion, or on a hook attached to at least one of the first handle portion and the second handle portion. A soiled pet refuse bag may be removed from a position nested in a clean pet refuse bag, or a soiled pet refuse bag may be removed from a position alongside another pet refuse bag and unfolding a clean pet refuse bag into the position on the trapezoidal loop.

Although FIG. 13 shows example blocks of process 1300, in some implementations, process 1300 may include additional blocks, fewer blocks, different blocks, or differently arranged blocks than those depicted in FIG. 13. Additionally, or alternatively, two or more of the blocks of process 1300 may be performed in parallel.

CONCLUSION

A number of embodiments of the present disclosure have been described. While this specification contains many specific implementation details, they should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings, and the detailed description thereto, are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "May" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A disposable pet refuse collection bag, comprising:
   a body portion formed from a material suitable for containing pet refuse;
   a hem formed along an opening of the body portion; the hem being adapted to removably engage with a trapezoidal loop of a refuse bag support apparatus;
   a drawstring integrated within the hem for selectively closing the opening of the body portion, thereby enabling closure of the disposable pet refuse collection bag after use;
      wherein the drawstring further comprises a first handle ribbon and a second handle ribbon; and
      wherein each of the first handle ribbon and the second handle ribbon are accessible through respective notches cut into the hem on opposing sides of the body portion;
   an edge seam securing the drawstring to the disposable pet refuse collection bag; and
   one or more notches cut along the hem, providing one or more points for accessing and pulling the drawstring for closing the disposable pet refuse collection bag.

2. The disposable pet refuse collection bag of claim 1, wherein the first handle ribbon and the second handle ribbon are secured to the edge seam through heat seal.

3. The disposable pet refuse collection bag of claim 1, wherein the first handle ribbon and the second handle ribbon are placed parallel along opposite long edges of the opening of the body portion, the hem is folded over the first handle ribbon and the second handle ribbon, and the hem is heat-sealed to encase the first handle ribbon and the second handle ribbon within the hem.

4. The disposable pet refuse collection bag of claim 1, wherein pulling the first handle ribbon and the second handle ribbon in opposing directions gathers the hem to close the disposable pet refuse collection bag.

5. The disposable pet refuse collection bag of claim 1, wherein the first handle ribbon and the second handle ribbon are configured to be tied together to secure the disposable pet refuse collection bag in a closed position.

6. The disposable pet refuse collection bag of claim 1, wherein the first handle ribbon and the second handle ribbon are used to carry a used disposable pet refuse collection bag.

7. The disposable pet refuse collection bag of claim 1, wherein the material suitable for containing the pet refuse consists of one or more from the following group: oil-based plastic, coated paper, coated fiber, and biodegradable plastic.

8. The disposable pet refuse collection bag of claim 1, wherein the drawstring further comprising multiple pieces of ribbons joined through heat seal into a continuous loop of a handle ribbon.

9. The disposable pet refuse collection bag of claim 1, wherein the hem further comprising multiple cutouts providing a user with multiple options for collecting and sealing the pet refuse in the disposable pet refuse collection bag.

10. The disposable pet refuse collection bag of claim 1, further comprising a refuse bag pouch formed in or attached to the body portion, wherein the refuse bag pouch receives the disposable pet refuse collection bag and the pet refuse after use.

11. The disposable pet refuse collection bag of claim 1, wherein the hem further comprising perforations along its length to support unused bags on a handle for refuse bags.

12. The disposable pet refuse collection bag of claim 1, wherein the refuse bag support apparatus further comprising:
  a hook fixedly attached to a first brace of the refuse bag support apparatus, said hook is extended into the trapezoidal loop, said hook is sized and positioned to engage the hem, while the trapezoidal loop supports the disposable pet refuse collection bag with a first refuse bag support and a second refuse bag support provided in the refuse bag support apparatus.

13. A method for manufacturing a refuse bag, the method comprising:
  providing a sheet of a material cut to a predetermined length and width;
  punching a series of holes over longitudinal edges along a length of the sheet at predetermined intervals;
  positioning handle ribbons parallel to the longitudinal edges of the sheet and across the series of holes;
  folding the longitudinal edges of the sheet over the handle ribbons and creating a hem along each longitudinal edge;
  applying a first heat seal along the hem to encase the handle ribbons within the hem;
  folding the sheet along a center line to align the hem along each latitudinal edge and the handle ribbons on opposing sides creating both sides of an opening of the refuse bag;
  applying a second heat seal at intervals perpendicular to the center line to form individual refuse bags connected in a series, and to affix the handle ribbons to an edge seam of the sheet; and
  cutting a connected series of the individual refuse bags at predetermined intervals to separate the individual refuse bags, wherein the cutting is performed between two heat seals perpendicular to the center line and between two individual refuse bags in the connected series of the individual refuse bags.

14. The method of claim 13, further comprising pulling the handle ribbons through one or more of the series of holes for closing the refuse bag.

15. The method of claim 13, wherein the handle ribbons are configured to be tied together to secure the refuse bag in a closed position after use.

16. The method of claim 13, further comprising carrying a used refuse bag using the handle ribbons.

17. The method of claim 13, further comprising removably engaging the refuse bag with a trapezoidal loop of a refuse bag support apparatus.

18. The method of claim 17, additionally comprising a step of storing a soiled refuse bag on a hook attached to the refuse bag support apparatus.

19. The method of claim 13, further comprising providing a refuse bag pouch formed in or attached to a body portion of the refuse bag, wherein the refuse bag pouch receives the refuse bag and pet refuse after use.

\* \* \* \* \*